US008605471B2

(12) United States Patent
Ogura et al.

(10) Patent No.: US 8,605,471 B2
(45) Date of Patent: Dec. 10, 2013

(54) POWER CONVERSION DEVICE (75) Inventors: Takashi Ogura, Hitachinaka (JP);
Satoru Shigeta, Hitachinaka (JP);
Hiroaki Igarashi, Hitachinaka (JP);
Koichi Ono, Naka (JP); Yasuo Noto,
Hitachinaka (JP)

(73) Assignee: Hitachi Automotive System, Ltd.,
Hitachinaka-shi (JP)

( * ) Notice: Subject to any disclaimer, the term of this patent is extended or adjusted under 35 U.S.C. 154(b) by 260 days.

(21) Appl. No.: 13/160,724

(22) Filed: Jun. 15, 2011

(65) Prior Publication Data
US 2011/0310644 A1 Dec. 22, 2011

(30) Foreign Application Priority Data

Jun. 16, 2010 (JP) ................................. 2010-137299

(51) Int. Cl.
*H02H 7/122* (2006.01)
*H02M 7/5387* (2007.01)

(52) U.S. Cl.
USPC .................................... 363/56.03; 363/56.05

(58) Field of Classification Search
USPC .............. 363/55, 56.01, 56.02, 56.03, 56.04, 363/56.05, 95, 97, 98, 131, 132; 361/87, 361/91.1, 93.1
See application file for complete search history.

(56) References Cited

U.S. PATENT DOCUMENTS

| | | | | |
|---|---|---|---|---|
| 5,274,541 A | * | 12/1993 | Kimura et al. | 363/56.02 |
| 6,522,557 B2 | * | 2/2003 | Ito et al. | 363/41 |
| 6,683,799 B2 | * | 1/2004 | Kato et al. | 363/37 |

FOREIGN PATENT DOCUMENTS

| | | |
|---|---|---|
| JP | 11-27984 A | 1/1999 |
| JP | 2002-17098 A | 1/2002 |
| JP | 2002-199744 A | 7/2002 |
| JP | 2003-88093 A | 3/2003 |
| JP | 2004-278472 A | 10/2004 |
| JP | 2009-201194 A | 9/2009 |

OTHER PUBLICATIONS

Japanese Office Action with English Translation dated Aug. 20, 2013 (eleven (11) pages).

* cited by examiner

*Primary Examiner* — Gary L Laxton
(74) *Attorney, Agent, or Firm* — Crowell & Moring LLP (57) ABSTRACT A power conversion device includes: an inverter that converts a DC current supplied from a DC power source to an AC current by engaging a plurality of switching elements, which constitute an upper arm, and a plurality of switching elements, which constitute a lower arm, in switching operation; a control unit that includes a signal generation unit that generates a switching signal carrying a command for execution of the switching operation in correspondence to each of the plurality of switching elements constituting the upper arm and the plurality of switching elements constituting the lower arm, and outputs the switching signal thus generated as a control signal; and a drive unit that individually drives each of the switching elements based upon the corresponding control signals. The control unit includes a plurality of protection circuits disposed in series on a control signal line extending between the signal generation unit and the drive unit, with each of the protection circuits outputting a control signal having been input thereto when a protective operation is not executed but outputting a control signal for setting the corresponding switching element either in a cut-off state or in an electrically continuous state in place of the control signal input thereto when the protective operation is executed.

10 Claims, 7 Drawing Sheets

| | | | | | | | | | | | |
|---|---|---|---|---|---|---|---|---|---|---|---|
| INPUT | GATE FAULT SIGNAL | H | – | – | – | – | – | – | – | – | L |
| | OVERVOLTAGE DETECTION SIGNAL OV | – | L | L | L | L | L | L | L | L | L |
| | LOWER ARM THREE-PHASE SHORTING SIGNAL (MAIN MICROCOMPUTER CONTROL SIGNAL) | – | H | – | – | – | – | – | – | – | L |
| | UPPER ARM THREE-PHASE SHORTING SIGNAL (MAIN MICROCOMPUTER CONTROL SIGNAL) | – | – | – | H | L | L | L | L | L | L |
| | OVERCURRENT DETECTION SIGNAL OC | – | – | – | – | H | L | L | L | L | L |
| | THREE-PHASE OPENING SIGNAL (MAIN MICROCOMPUTER CONTROL SIGNAL) | – | – | – | – | – | H | – | – | – | L |
| OUTPUT | UPPER ARM PWM SIGNAL | – | – | – | – | – | – | – | – | – | PWM |
| | LOWER ARM PWM SIGNAL | – | – | – | – | – | – | – | – | – | PWM |
| | UPPER ARM STATE | OFF | OFF | OFF | ON | OFF | OFF | OFF | OFF | OFF | PWM |
| | LOWER ARM STATE | OFF | ON | ON | OFF | OFF | OFF | OFF | OFF | OFF | PWM |
| | 3 PHASE STATUS | THREE-PHASE OPEN | LOWER ARM THREE-PHASE SHORT | LOWER ARM THREE-PHASE SHORT | UPPER ARM THREE-PHASE SHORT | | | | THREE-PHASE OPEN | THREE-PHASE OPEN | PWM SWITCHING |

POWER CONVERSION DEVICE

INCORPORATION BY REFERENCE

The disclosure of the following priority application is herein Incorporated by reference:
Japanese Patent Application No. 2010-137299 filed Jun. 16, 2010

BACKGROUND OF THE INVENTION

1. Field of the Invention

The present invention relates to a power conversion device with semiconductor switching elements.

2. Description of Related Art

The device disclosed in Japanese Laid Open Patent Publication No. 2003-88093, which executes power conversion via an inverter circuit equipped with semiconductor switching elements and supplies the power resulting from the power conversion to a load, includes a plurality of protection circuits such as an overcurrent protection circuit and an overvoltage protection circuit.

SUMMARY OF THE INVENTION

The various protection circuits in the device disclosed in Japanese Laid Open Patent Publication No. 2003-88093 execute protective operations independently of one another. Thus, a concern arises in that even when a given protective operation is to be executed with priority in order to, for instance, protect the device, another protective operation may be initiated.

A power conversion device according to a first aspect of the present invention, comprises: an inverter that converts a DC current supplied from a DC power source to an AC current by engaging a plurality of switching elements, which constitute an upper arm, and a plurality of switching elements, which constitute a lower arm, in switching operation; a control unit that includes a signal generation unit that generates a switching signal carrying a command for execution of the switching operation in correspondence to each of the plurality of switching elements constituting the upper arm and the plurality of switching elements constituting the lower arm, and outputs the switching signal thus generated as a control signal; and a drive unit that individually drives each of the switching elements based upon the corresponding control signals, wherein: the control unit includes a plurality of protection circuits disposed in series on a control signal line extending between the signal generation unit and the drive unit, with each of the protection circuits outputting a control signal having been input thereto when a protective operation is not executed but outputting a control signal for setting the corresponding switching element either in a cut-off state or in an electrically continuous state in place of the control signal input thereto when the protective operation is executed.

According to a second aspect of the present invention, in the power conversion device according to the first aspect, it is preferable that the control unit includes a first protection circuit and a second protection circuit connected in series; the first protection circuit, to which the switching signal provided by the signal generation unit is input, outputs a control signal for setting each of the switching elements in the cut-off state in correspondence to the switching elements constituting the upper arm and the lower arm in place of the switching signal having been input thereto if a first trigger signal is input thereto due to an occurrence of an abnormality but directly outputs the switching signal having been input thereto as a control signal if the first trigger signal is not input; the second protection circuit, to which a control signal pertaining to one of the upper arm and the lower arm, among control signals output from the first protection circuit, is input, outputs a control signal for setting each of the switching elements constituting the one of the upper arm and the lower arm into the electrically continuous state in place of the control signal having been input thereto from the first protection circuit when a second trigger signal is input thereto due to an occurrence of an abnormality but directly outputs the control signal having been input thereto from the first protection circuit if the second trigger signal is not input; and the drive unit individually drives each of the switching elements constituting the upper arm and the switching elements constituting the lower arm based upon the control signal pertaining to the one of the upper arm and the lower arm output from the second protection circuit and a control signal pertaining to an other arm output from the first protection circuit.

According to a third aspect of the present invention, in the power conversion device according to the second aspect, it is preferable that as a first protection signal for setting all the switching elements constituting one of the upper arm and the lower arm in the electrically continuous state and setting all the switching elements constituting an other arm in the cut-off state is generated, the control unit creates a first period during which all the switching elements constituting the one of the upper arm and the lower arm sustain the electrically continuous state and all the switching elements constituting an other arm sustain the cut-off state by inputting the first protection signal to the first protection circuit as the first trigger signal and inputting the first protection signal to the second protection circuit as the second trigger signal, with the first period directly preceded by and directly followed by a second period during which all the switching elements constituting both the upper arm and the lower arm remain in the cut-off state.

According to a fourth aspect of the present invention, in the power conversion device according to the third aspect, the second period may be set so as to extend over a length of time equal to or greater than a dead time value guaranteed by the inverter.

According to a fifth aspect of the present invention, in the power conversion device according to the third aspect, it is preferable that the control unit includes; a delay circuit that retards timing with which the second trigger signal is input to the second protection circuit by a predetermined length of time corresponding to the second period directly preceding the first period relative to timing with which the first trigger signal is input to the first protection circuit; and a timer circuit that causes the first trigger signal to be continuously input to the first protection circuit over a predetermined length of time corresponding to the second period directly following the first period even after generation of the first protection signal stops.

According to a sixth aspect of the present invention, the power conversion device according to the third aspect may further comprise: an overvoltage detection unit that generates an overvoltage detection signal to be used as the first protection signal when a voltage value indicating a voltage at a DC power source line through which the DC current is supplied exceeds a predetermined overvoltage threshold value.

According to a seventh aspect of the present invention, in the power conversion device according to the sixth aspect, the overvoltage threshold value may be set so that the voltage at a start of the first period never exceeds a DC voltage obtained by subtracting a switching surge voltage from a voltage withstand limit of the switching elements.

According to an eighth aspect of the present invention, in the power conversion device according to the second aspect, it is preferable that when a second protection signal for setting all the switching elements constituting both the upper arm and the lower arm in the cut-off state is generated, the control unit inputs the second protection signal to the first protection circuit as the first trigger signal.

According to a ninth aspect of the present invention, the power conversion device according to the second aspect may further comprise: an overcurrent detection unit that generates an overcurrent detection signal to be used as the second protection signal when a current value indicating an electric current on an output side of the inverter exceeds an overcurrent threshold value.

According to a tenth aspect of the present invention, in the power conversion device according to the second aspect, it is preferable that there is further provided an abnormality detection unit that generates a third trigger signal upon detecting an abnormality in the inverter, wherein: a third protection circuit is disposed on an output side of the second protection circuit on the control line, wherein the control signal pertaining to the one of the upper arm and the lower arm output from the second protection circuit and the control signal pertaining to the other arm output from the first protection circuit are input to the third protection unit, and the third protection unit outputs to all the switching elements a control signal for setting all the switching elements constituting the upper arm and the lower arm in the cut-off state if the third trigger signal is input thereto but directly outputs the control signals having been input thereto from the first protection circuit and the second protection circuit if the third trigger signal is not input thereto.

DESCRIPTION OF PREFERRED EMBODIMENT

Figure 1:
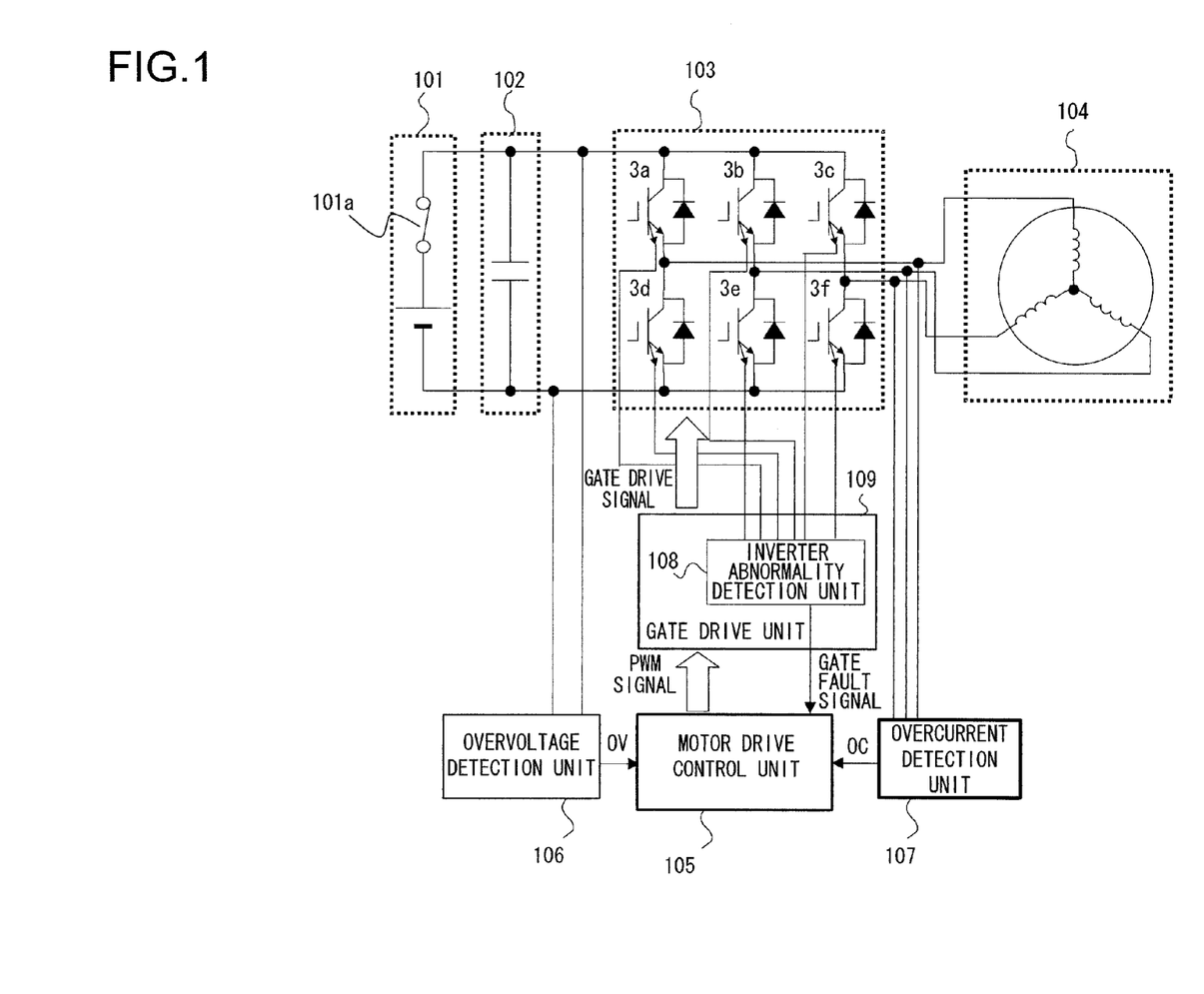
FIG. 1 is a circuit diagram pertaining to an embodiment achieved by adopting a power conversion device according to the present invention in a motor drive device for a hybrid vehicle.

An embodiment achieved by adopting a power conversion device according to the present invention in a hybrid vehicle motor drive device is described below in reference to the drawings. FIG. 1 is a circuit diagram pertaining to the hybrid vehicle motor drive device achieved in the embodiment by adopting the power conversion device. In FIG. 1, reference numeral 101 indicates a DC power source, reference numeral 102 indicates a smoothing capacitor, reference numeral 103 indicates an inverter unit, reference numeral 104 indicates a motor, reference numeral 105 indicates a motor drive control unit, reference numeral 106 indicates an overvoltage detection unit, reference numeral 107 indicates an overcurrent detection unit, reference numeral 108 indicates an inverter abnormality detection unit and reference numeral 109 indicates a gate drive unit. The smoothing capacitor 102 is connected in parallel to the DC power source 101. The DC power source 101 includes a contactor 101a.

The inverter unit 103 is constituted with semiconductor switching elements 3a to 3f, which are connected through a three-phase full bridge connection. The switching elements 3a to 3f in the embodiment are each constituted with an IGBT, with a reflux diode disposed in parallel to each IGBT. The overvoltage detection unit 106 measures the voltage between a positive electrode-side line and a negative electrode-side line at the DC power source 101 and upon detecting an overvoltage, it outputs an overvoltage detection signal OV to the motor drive control unit 105 functioning as a drive control unit for the motor 104. The overcurrent detection unit 107 measures the electric current at various lines at the motor 104 and upon detecting an overcurrent, it outputs an overcurrent detection signal OC to the motor drive control unit 105.

The inverter abnormality detection unit 108 outputs a gate fault signal, which constitutes an inverter abnormality detection signal, to the motor drive control unit 105 upon detecting an abnormality at the motor 104, a semiconductor switching element or the inverter unit 103. It judges that an abnormality has occurred if, for instance, a shorting current is detected at the IGBT constituting any of the semiconductor switching elements 3a through 3f or the gate drive source voltage at an IGBT becomes lower than a threshold value.

An IGBT shorting current may be detected by, for instance, using a current mirror IGBT or monitoring the voltage between the collector and the emitter at the IGBT. A threshold value for the IGBT shorting current detection may be set so that a shorting current is detected if, for instance, an electric current at least twice the threshold value set for the overcurrent detection unit 107 flows for several μs. As the gate drive source voltage becomes lower, the voltage between the collector and the emitter is bound to rise, leading to an increase in the heat generated at the chip. Accordingly, the detection threshold value should be set to a value with which it can be ensured that the chip temperature never exceeds the rated heat level. The operation executed in response to a gate fault signal output upon detecting an abnormality at the inverter unit 103 will be described later.

The gate drive unit 109 outputs gate drive signals, which correspond to switching control signals provided from a motor control microcomputer 206 (see FIG. 2) in the motor drive control unit 105, to the semiconductor switching element 3a to 3f included in the inverter unit 103. During regular drive, a PWM (pulse width modulation) control signal, output from the motor control microcomputer 206, is directly input to the gate drive unit 109 as the switching control signal provided by the motor drive control unit 105. A gate drive signal generated based upon the PWM control signal is then input to the inverter unit 103. As the semiconductor switching element 3a through 3f included in the inverter unit 103 are switched based upon the corresponding PWM control signals as described above, a DC voltage input from the DC power source 101 to the inverter unit 103 is converted to the required three-phase AC current.

Figure 2:
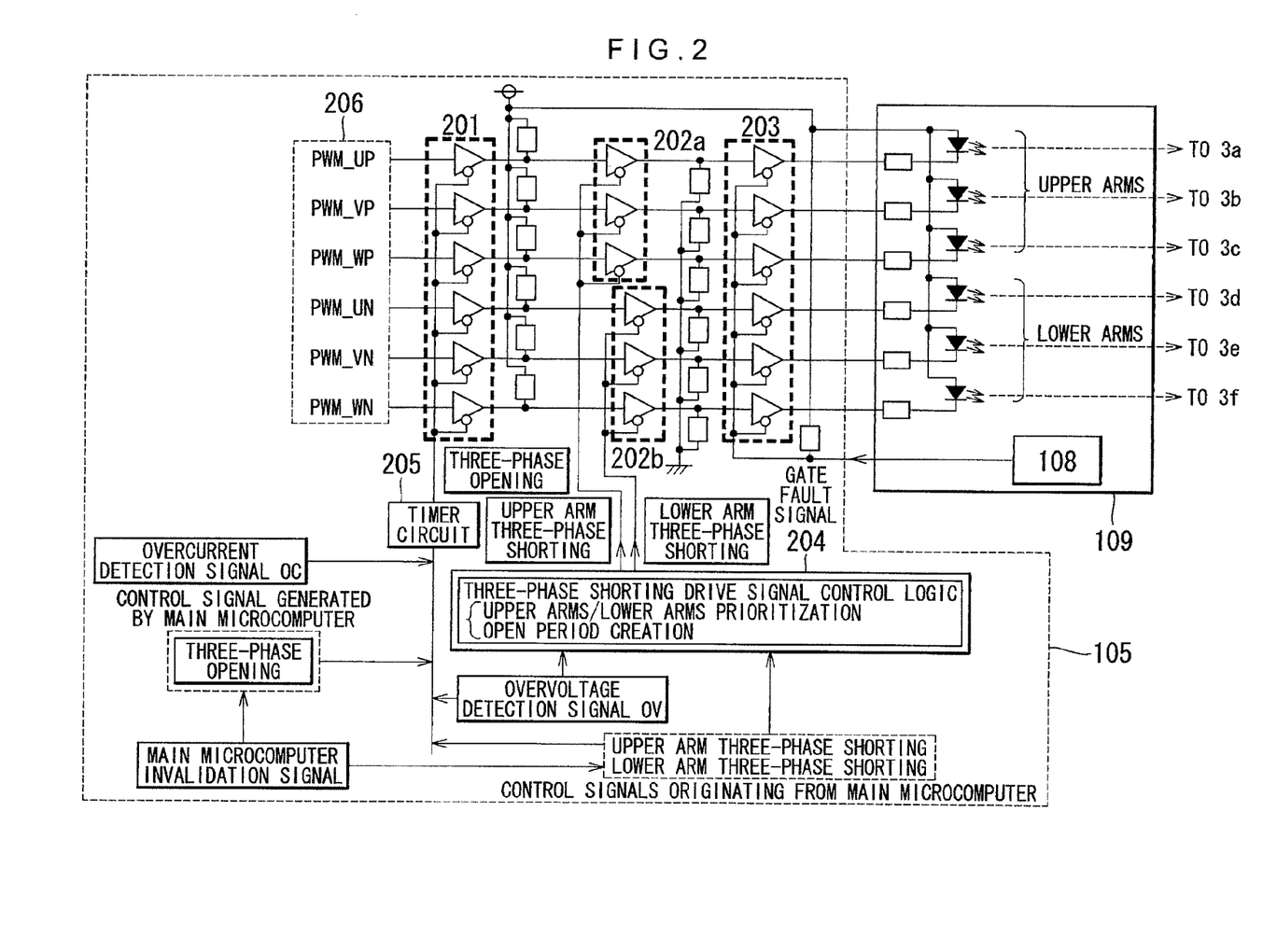
FIG. 2 shows a logic circuit in the motor drive control unit in FIG. 1.

FIG. 2 shows the logic circuit in the motor drive control unit 105. In the embodiment, the motor control microcomputer 206 installed in the motor drive control unit 105 and a main microcomputer (not shown), which is a higher-order control device relative to the motor control microcomputer 206, are utilized. The motor drive control unit 105 is normally controlled by the motor control microcomputer 206. The motor control microcomputer 206 executes PWM control by calculating through arithmetic operation the optimal switching time interval for the semiconductor switching elements in the inverter unit 103 so as to apply a desired torque to the motor or rotate the motor at a given rotation rate. Consequently, the drive of the motor 104 is controlled with the AC voltages and currents applied to the individual phases at the motor 104.

Any abnormality at the motor control microcomputer 206 may cause faulty operations of the IGBTs and the motor 104 and may even lead to destruction of the IGBTs. For this reason, upon detecting an abnormality at the motor control microcomputer 206, the main microcomputer directly outputs a control signal, which is used as a trigger signal for three-phase opening or three-phase shorting, by bypassing the motor control microcomputer 206 so as to assure vehicle safety through three-phase shorting or three-phase opening at the inverter unit 103. The main microcomputer may detect any abnormality occurring at the motor control microcomputer 206 by, for instance, checking whether or not the motor control microcomputer 206 returns a correct response to an arithmetic operation command issued by the main microcomputer to the motor control microcomputer 206 (e.g., a response to a "1+1" arithmetic operation command) through an SPI (serial peripheral interface) communication conducted between the main microcomputer and the motor control microcomputer 206.

Buffers 201, 202a, 202b and 203 functioning as protection circuits are disposed on switching control signal lines extending between the motor control microcomputer 206 and the gate drive unit 109. The buffers 201 and 203 are installed on all the switching control signal lines extending to the semiconductor switching elements 3a through 3f, which constitute upper and lower arms. The buffers 202a are installed on the switching control signal lines extending to the semiconductor switching elements 3a, 3b and 3c constituting the upper arms. The buffers 202b are installed on the switching control signal lines extending to the semiconductor switching elements 3d, 3e and 3f constituting the lower arms.

Switching control signals output from the motor control microcomputer 206, based upon which the various semiconductor switching elements 3a through 3f are driven for purposes of switching, are input to the gate drive unit 109 via the buffers 201, 202a, 202b and 203. The buffers 201, 202a, 202b and 203 are each a three-state buffer, the state of which is altered in response to a control signal input thereto, which may be, for instance, the trigger signal for triggering the three-phase open state or three-phase shorted state mentioned earlier.

As long as the motor control microcomputer 206 and the like are error-free and no trigger signal, which is generated in the event of an abnormality, is input, the buffers 201, 202a, 202b and 203 sustain an electrically continuous state and directly output the switching control signals having been input thereto from the motor control microcomputer 206. If, on the other hand, a trigger signal is input, the various buffers 201, 202a, 202b and 203 each enter a cut-OFF state (high impedance state). As the buffers 201 enter the cut-OFF state, the output sides of the buffers 201 (i.e., the input sides of the buffers 202a and 202b) are pulled up to the high state. As the buffers 202a and 202b enter the cut-OFF state, the output sides of the buffers 202a and 202b (i.e., the input sides of the buffers 203) are pulled down to the low state. As the buffers 203 enter the cut-OFF state, the output sides of the buffers 203 (i.e., the input side of the gate drive unit 109) shifts into a high impedance state, and since the photocoupler in the gate drive unit 109 cannot sustain electrical continuity in this state, the switching elements 3a through 3f are turned off. It is to be noted that when the outputs from the buffers 203 are high, the photocoupler cannot sustain electrical continuity and thus, the switching elements 3a through 3f are turned off.

In response to a low signal input thereto, the gate drive unit 109 outputs a gate drive signal that will turn on a semiconductor switching element, (i.e., the gate drive signal will set the semiconductor switching element in an electrically continuous state), whereas in response to a high signal input thereto, the gate drive unit 109 outputs a gate drive signal that will turn off the semiconductor switching element (i.e., the gate drive signal will set the semiconductor switching element in a cut-OFF state). In the event of an abnormality occurring in the power conversion device, a protective operation, such as a three-phase open state, through which the semiconductor switching elements 3a to 3f are all turned off, or a three-phase shorting (upper arm three-phase shorting or lower arm three-phase shorting) operation, through which only either the upper arms 3a to 3c or the lower arms 3d to 3f are turned on and the other arms are turned off, is executed by cutting off the outputs of specific buffers among the buffers 201, 202a, 202b and 203.

(Three-Phase Opening Operation)

The three-phase open state is executed in response to a three-phase opening signal, i.e., a three-phase opening trigger signal, provided by the main microcomputer. It is to be noted that a three-phase open state executed in response to a signal other than the three-phase opening signal provided by the main microcomputer, more specifically, a three-phase open state executed in response to a gate fault signal, which is a trigger signal generated as the inverter abnormality detection unit 108 detects an abnormality at the inverter unit 103, will be described in detail later. The three-phase opening signal, originating from the main microcomputer and input to the motor drive control unit 105, is then input to the buffers 201 via a timer circuit 205.

As the three-phase opening signal is input to the buffers 201 as a control signal (trigger signal), the buffers 201 enter the cut-OFF state, as explained earlier, with the output sides of the buffers 201 shifting into the high state. However, the control signal is not input to the buffers 202a, 202b and 203 and thus, they all sustain the electrically continuous state. This means that any signal input to these buffers is output directly without altering its present state, i.e., the signal, sustaining its initial high or low state, is output. Namely, in the three-phase open state executed in response to the three-phase opening trigger signal input from the main microcomputer, high signals are input to the gate drive unit 109 in correspondence to all the semiconductor switching elements 3a through 3f constituting the upper and lower arms. As a result, the gate drive unit 109 does not output the gate drive signals for driving the semiconductor switching elements, and thus, the semiconductor switching elements 3a through 3f are all set in the cut-OFF state. It is to be noted that if high signals are input to the gate drive unit 109, gate drive signals for driving the semiconductor switching elements are not output to the inverter unit 103 and the semiconductor switching elements are turned off (set to the cut-off state), as explained above. If, on the other hand, low signals are input to the gate drive unit 109, the semiconductor switching elements are turned on (set to the electrically continuous state).

Even after the three-phase opening signal input from the main microcomputer ceases, the three-phase opening signal is continuously input to the buffers 201 over a specific length of time ($\Delta t2$ indicated in FIG. 3) set via the timer circuit 205 and once the specific length of time elapses, the three-phase opening signal is no longer input to the buffers 201. Without the three-phase opening signal input thereto, the buffers 201 enter the electrically continuous state and the operation returns to the regular PWM control.

(Three-phase Shorting Operation)

Figure 3:
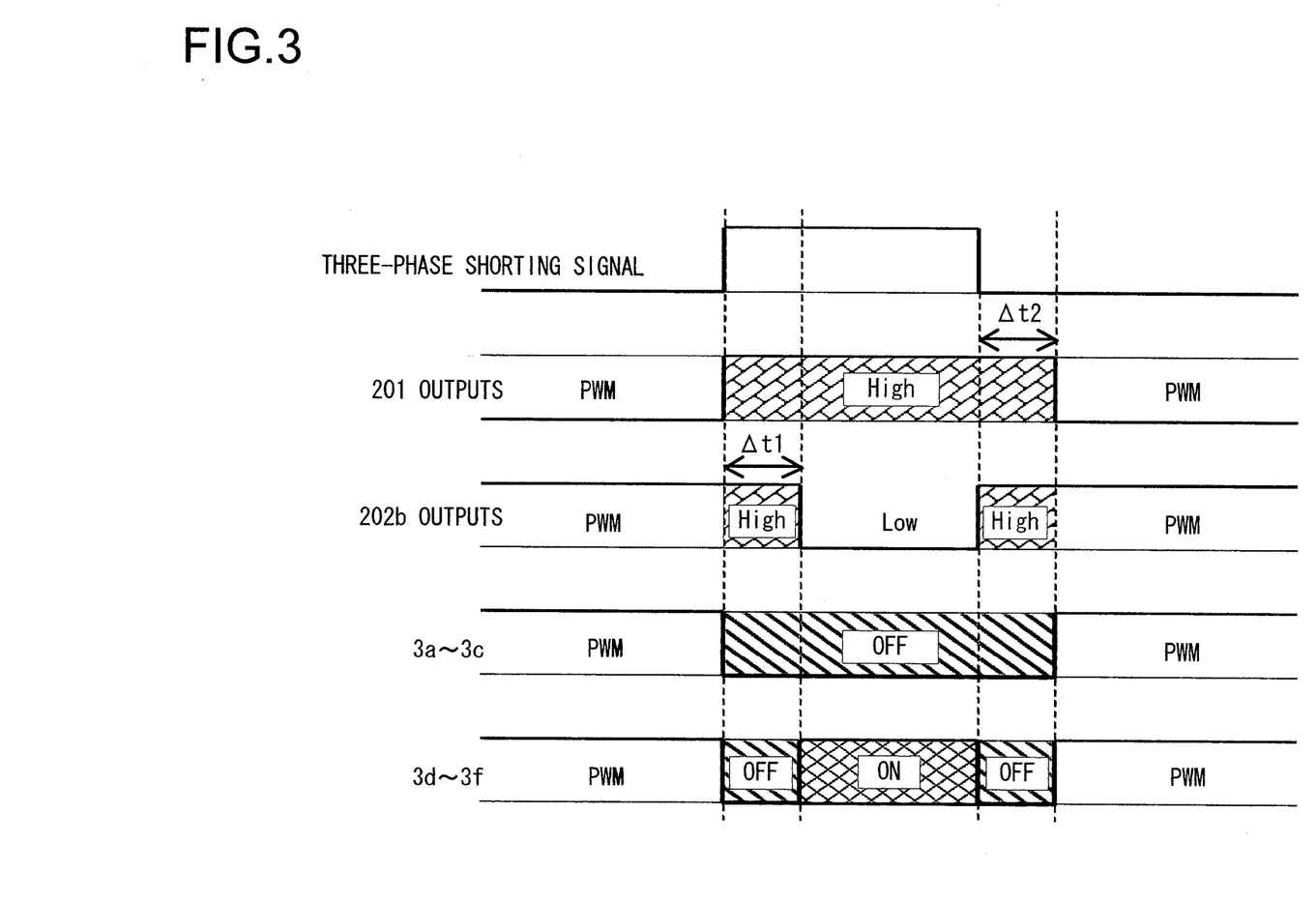
FIG. 3 illustrates a three-phase shorted state.

FIG. 3 illustrates the three-phase shorted state executed in the embodiment. As explained earlier, the upper arms corresponding to the three phases may be shorted or the lower arms corresponding to the three phases may be shorted through the three-phase shorted operation. In the example described below, three-phase shorting is achieved for the lower arms. FIG. 3 is a timing chart of the three-phase shorted state executed to short the lower arms corresponding to the three phases. It is to be noted that a timing chart pertaining to the upper arm three-phase shorted state will be similar to the timing chart of the lower arm three-phase shorted state presented in FIG. 3. A three-phase shorting signal (lower arm three-phase shorting signal) originating from the main microcomputer is input to the buffers 201 and a three-phase shorting drive signal control logic 204. In response to the three-phase shorting signal input to the buffers 201, the outputs of the buffers 201 are cut off. As a result, the input sides of the buffers 202a and 202b disposed at a stage to the rear of the buffers 201, is pulled up to the high state.

As described earlier, as a low signal is input to the gate drive unit 109, the corresponding semiconductor switching element is turned on and as a high signal is input to the gate drive unit 109, the corresponding semiconductor switching element is turned off. Thus, in response to the three-phase shorting signal input to the buffers 201, the input sides of the buffers 202a and 202b (the output sides of the buffers 201) shifts into the high state, as explained earlier. The high signals thus input to the buffers 203 simply pass through the buffers 203 and are directly input to the gate drive unit 109. As a result, the semiconductor switching elements 3a through 3f are turned off.

In addition, the three-phase shorting drive signal control logic 204 uses the three-phase shorting signal having been input thereto to create a delay and outputs an upper arm three-phase shorting signal (for an upper arm three-phase shorted state) or a lower arm three-phase shorting signal (for a lower arm three-phase shorted state) with a delay of a predetermined length Δt1 following the output cut-off at the buffers 201. The outputs of the buffers 202a or 202b thus become cut off. In the lower arm three-phase shorted state illustrated in FIG. 3, the lower arm three-phase shorting signal is output with the predetermined delay Δt1 following the output cut-off at the buffers 201. In other words, the outputs of the buffers 201 are first cut off and then the outputs of the buffers 202b are cut off with the predetermined delay Δt1.

As the outputs of the buffers 202b are cut off, the output sides of the buffers 202b are pulled down to the low state. As a result, low signals are input to the gate drive unit 109 for the lower-arm semiconductor switching elements 3d through 3f and the semiconductor switching elements 3d through 3f are thus turned on. As described above, the three-phase shorted state executed in the embodiment is achieved by first executing a three-phase open state for turning off all the semiconductor switching elements 3a through 3f and then turning on either the semiconductor switching elements 3a through 3c or the semiconductor switching elements 3d through 3f.

As the three-phase shorting signal dissipates, the buffers 202b (or the buffers 202a in the case of the upper arm three-phase shorted state) resume the electrically continuous state. At this time, the output sides of the buffers 201 shifts from high to low with a delay of Δt2, as described earlier, and thus, the semiconductor switching elements 3d through 3f assume the OFF state and a switch-over to the three-phase open state occurs even though the three-phase shorting signal is no longer input. Then, after the outputs of the buffers 201 are held in the OFF state over the length of time matching the delay Δt2 set via the timer circuit 205, the buffers 201 shift back into the electrically continuous state and thus, the regular PWM control is resumed when the length of time Δt2 elapses following the dissipation of the three-phase shorting signal. In other words, after the three-phase shorting signal dissipates, a three-phase open state is first achieved and only then does the operation go back to regular PWM control.

As described above, under the three-phase shorted state control executed in the embodiment, a period of time during which the three-phase open state is achieved is created both before and after the three-phase shorting of the semiconductor switching elements actually occurs. The IGBT constituting each semiconductor switching element in the inverter unit experiences a dead time inherent to the IGBT during the switching operation, i.e., experiences a period during which it remains unstable as the semiconductor switching element is switched from on to off or from off to on by a gate drive signal. Accordingly, by executing the three-phase shorting control described above with gate drive signals that will sustain the semiconductor switching elements in the OFF state so as to keep the upper and lower-arm semiconductor switching elements in the open state over a period of time longer than the IGBT dead time, shorting of the upper-arm semiconductor switching elements and the lower-arm semiconductor switching elements can be effectively prevented, so as to assure a high level of safety. For instance, assuming the rated dead time of the IGBTs constituting the semiconductor switching elements 3a through 3f is 5 μs, the three-phase open periods (Δt1, Δt2) during which the three-phase open state is sustained before and after the three-phase shorted period should last at least 5 μs, in order to prevent upper arm/lower arm shorting with a high degree of reliability.

In addition, by configuring the sequence of protection logic, the timer circuit 205 and the three-phase shorting drive signal control logic 204 as hardware circuits, a reduction in cost will be achieved over the structure constituted with microcomputers and software. Furthermore, even in the event of a microcomputer error or a software bug, protective operations can be executed by ensuring that sufficient three-phase open periods are allowed to elapse. As a result, a three-phase shorted state is executed while assuring a satisfactory level of safety.

Figure 4:
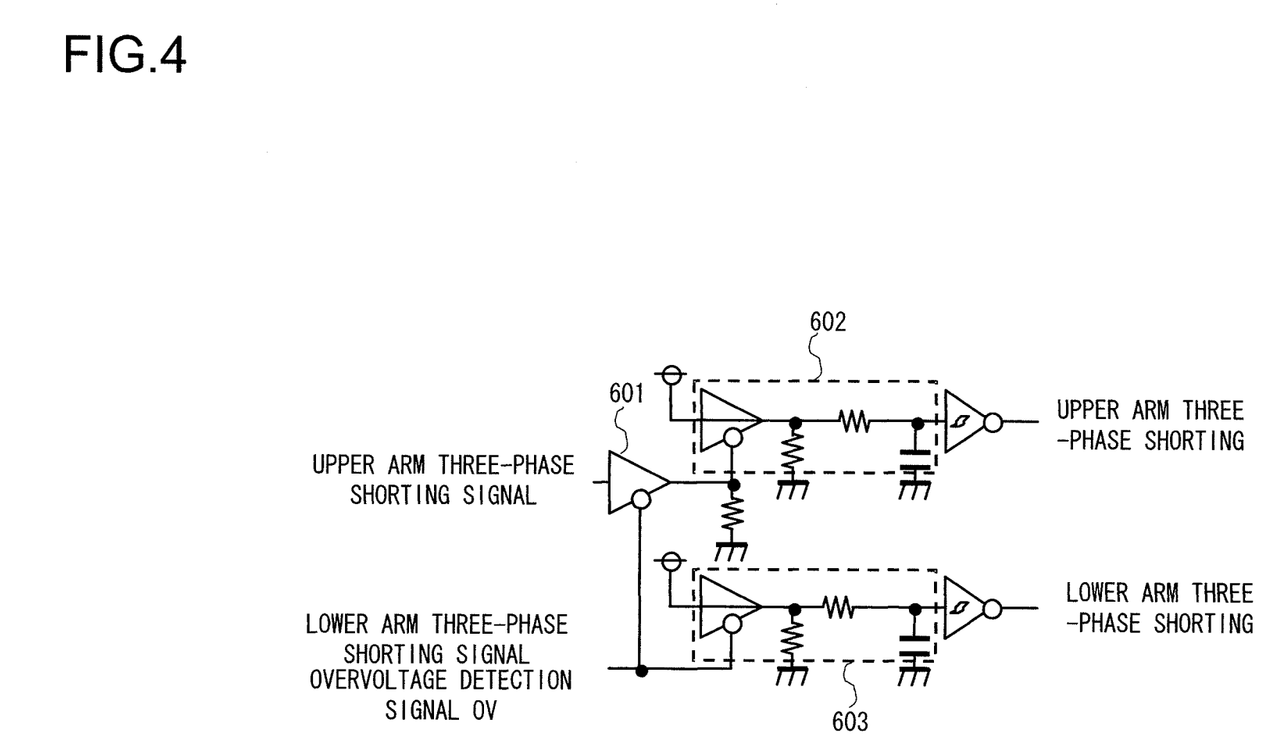
FIG. 4 is a detailed circuit diagram pertaining to the three-phase shorting drive signal control logic.

FIG. 4 is a detailed circuit diagram of the three-phase shorting drive signal control logic 204. The three-phase open period Δt1 mentioned above is created via a circuit 602 and a circuit 603 of FIG. 4. By adjusting the design constants for the resistors and the capacitors disposed in the circuits 602 and 603, the length of the three-phase open period Δt1 can be controlled.

As explained earlier, the control signals provided by the main microcomputer include the upper arm three-phase shorting signal for cutting off the outputs of the buffers 202a and the lower arm three-phase shorting signal for cutting off the outputs of the buffers 202b. If these two signals are output at the same time, shorting of the semiconductor switching elements corresponding to the upper arms and the semiconductor switching elements corresponding to the lower arms may occur. Accordingly, the motor drive control unit 105 uses a three-phase shorting drive signal control logic 204 such as that shown in FIG. 4 so as to set priority levels for the upper arm three-phase shorting signal and the lower arm three-phase shorting signal, thereby ensuring that there is no shorting of the semiconductor switching elements for the upper arms and the lower arms.

In reference to FIG. 4, a situation in which the main microcomputer has output the upper arm three-phase shorting signal and the lower arm three-phase shorting signal at the same time is examined. As the lower arm three-phase shorting signal is input, the output of a buffer 601 is cut off. Thus, if the upper arm three-phase shorting signal and the lower arm three-phase shorting signal are input at the same time, only the lower arm three-phase shorting signal is allowed to pass through the circuit 603, and is output to the buffers 201 but the upper arm three-phase shorting signal is not output. In other words, the buffer 601 allows the lower arm three-phase shorting signal to be output with priority. It is to be noted that the upper arm three-phase shorting signal and the lower arm three-phase shorting signal can be prioritized as desired by switching signal inputs. As described above, even when the upper arm three-phase shorting signal and the lower arm three-phase shorting signal are output simultaneously due to an error, either the upper arm three-phase shorting signal or the lower arm three-phase shorting signal will have priority over the other via the three-phase shorting drive signal control logic 204 shown in FIG. 4, thereby ensuring that only the semiconductor switching elements either on the upper arm side or on the lower arm side are turned on, ultimately ensuring that shorting between the upper arm side and the lower arm side does not occur. Furthermore, the overvoltage detection signal OV may also be input to the three-phase shorting drive signal control logic 204 to effectively prevent shorting between the upper side and the lower side even when a three-phase shorting signal originating from the main microcomputer and the overvoltage detection signal OV are generated at the same time.

(Operation Executed when an Overcurrent is Detected)

When phase-to-phase shorting or an earth fault occurs at the motor 104, the microcomputer malfunctions or the like, a large coil current may flow. Since an excessive coil current may burn the motor 104 or a cable, or destroy the semiconductor switching elements 3a through 3c, or the semiconductor switching elements 3d through 3f, it is essential that these members be protected by detecting any overcurrent. The structure achieved in the embodiment includes the overcurrent detection unit 107, as shown in FIG. 1. Upon detecting an overcurrent, the overcurrent detection unit 107 outputs an overcurrent detection signal (OC signal) to the motor drive control unit 105, as shown in FIG. 2. At the motor drive control unit 105, the overcurrent detection signal is input to the buffers 201 via the timer circuit 205. As a result, a three-phase open state is executed as a protective operation in response to the overcurrent detection. In the three-phase open state, the semiconductor switching elements 3a to 3f are all turned off and thus, the coil currents at the motor 104 can be kept down.

It is to be noted that while the three-phase open state is initiated in response to the overcurrent detection signal OC input to the motor drive control unit 105, as shown in FIGS. 1 and 2 in the embodiment, the three-phase open state may instead be initiated in response to a three-phase opening signal generated at the main microcomputer in response to the overcurrent detection signal OC input to the main microcomputer, which is then input to the motor drive control unit 105.

(Operation Executed when an Overvoltage is Detected)

The following is a description of a lower arm three-phase shorted state executed as a protective operation when an overvoltage error has occurred in a hybrid vehicle motor drive device that includes the power conversion device achieved in the embodiment. In a regenerative operation, the DC power source 101 is charged by controlling the inverter unit 103 so as to achieve a higher voltage at a DC power source line compared to the voltage at the DC power source 101. At this time, if an abnormality occurs at the DC power source line, e.g., if the contactor 101a at the DC power source 101 becomes turned off, the smoothing capacitor 102 will be charged rapidly and the voltage at the DC power source line will rise.

In addition, when the motor 104 rotates at high speed, the voltage induced at the motor 104 becomes more significant. Under these circumstances, if the voltage at the inverter unit 103 exceeds the DC power source voltage, an electric current will flow from the inverter unit 103 toward the DC power source 101. In this situation, if an error occurs at the DC power source line, e.g., if the contactor 101a at the DC power source 101 is turned off, the smoothing capacitor 102 will be charged rapidly, resulting in an increase in the voltage at the DC power source line.

If the voltage at the DC power source line, rising as described above, exceeds even for a moment the voltage threshold that the semiconductor switching elements 3d to 3f are capable of handling, the semiconductor switching elements 3d to 3f will be destroyed. For this reason, it is necessary to monitor the voltage at the DC power source line and lower the voltage at the DC power source line prior to voltage application whenever the voltage is high enough to destroy the switching elements 3d to 3f.

Figure 5:
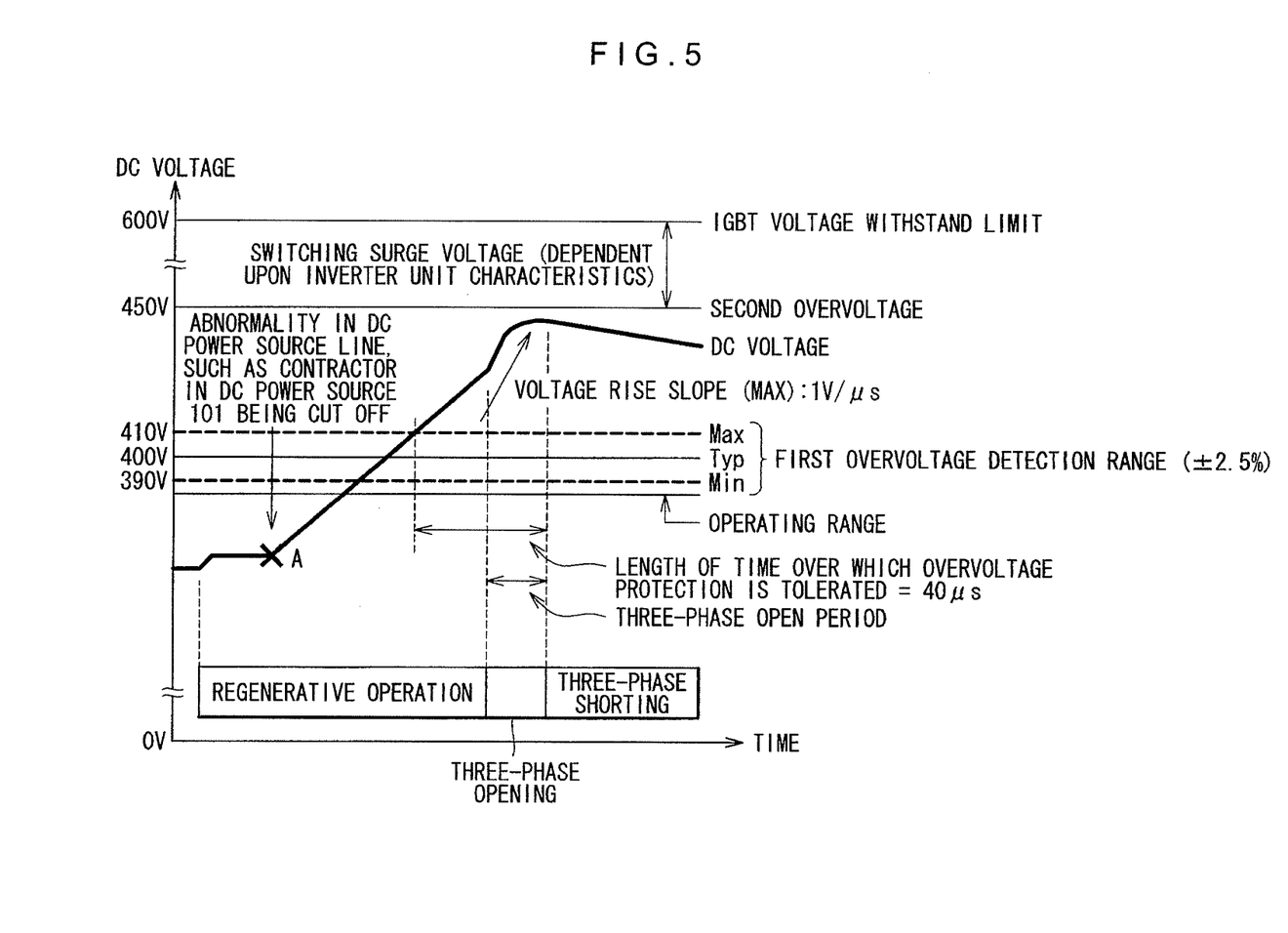
FIG. 5 illustrates the operation executed when an overvoltage is detected.

Accordingly, a threshold value is set at the overvoltage detection unit 106 by taking into consideration the voltage withstand limit of the semiconductor switching elements 3d to 3f and the length of delay occurring before the protective operation starts and a three-phase shorted operation is executed upon detecting an overvoltage at the DC power source line, as shown in FIG. 5 in the embodiment. Through the three-phase shorted state, an electric current circulates between the motor 104 and the semiconductor switching elements 3d to 3f and thus, the increase in voltage at the DC power source line can be minimized. The length of time over which the three-phase shorted state is sustained in this situation is greatly affected by factors such as the motor rotation rate and the vehicle operating conditions.

The following is a detailed description of the overvoltage detection threshold value given in reference to FIG. 5. The voltage applied to the semiconductor switching elements 3d to 3f (IGBTs) is the sum of the DC power source line voltage and the switching surge. Accordingly, the semiconductor switching elements need to be protected by ensuring that the voltage sum does not exceed the voltage withstand limit of the IGBTs. In this description, the term "first overvoltage" is defined as a DC voltage upon detection of which the operation shifts into the protective operation (i.e., the overvoltage detection threshold value) and the term "second overvoltage" is defined as a DC voltage representing the difference obtained by subtracting the switching surge voltage from the IGBT voltage withstand limit.

A value representing a voltage level between the IGBT operating range and the second overvoltage, which does not compromise the IGBT operating range and does not allow the voltage to reach a level matching the second over voltage at the protective operation start point, is selected for the first overvoltage by factoring in detection variance and detection delay. In addition, the second overvoltage is determined based upon the characteristics of the IGBTs and the inverter unit 103. Under normal circumstances, if a higher IGBT voltage withstand limit is assumed, the on voltage is bound to become higher, to result in greater heat generation. This, in turn, will require special measures to improve the cooling performance or require a greater chip area, leading to lower inverter efficiency, an increase in the size of the inverter or an increase in production cost. For this reason, it is critical that the IGBT voltage withstand limit and the second overvoltage be minimized.

The accuracy with which the first overvoltage is detected and the first overvoltage detection delay time are essential factors in the attempt to minimize the IGBT voltage withstand limit and the second overvoltage. If the detection accuracy is poor, a source voltage exceeding the first overvoltage will not be detected promptly. In other words, by assuring a high level of detection accuracy, the detection delay time (first overvoltage detection delay time) to elapse before a voltage exceeding the first overvoltage is actually detected can be shortened. While some delay is still bound to occur, a time margin large enough to allow a measurement noise removal filter to be inserted can be created by improving the detection accuracy. While such a noise removal filter is indispensable, sensors assuring higher accuracy are bound to be more expensive, and thus, it is essential to strike an optimal balance between an acceptable level of accuracy and an acceptable length of delay for the sensor engaged in overvoltage detection.

If an abnormality at the DC power source line causes the contactor 101a at the DC power source 101 to be cut off at point A in FIG. 5 while the regenerative operation is in progress, the voltage at the DC power source line increases. The extent by which the voltage increases in this situation may be, for instance, approximately 1 V/μs. The following description is given by assuming that the first overvoltage detection range is 400 V±10 V. After the voltage at the DC power source line rises to the highest level (Max) at the upper limit of the first overvoltage detection range, the overvoltage detection unit 106 first lets the first overvoltage detection delay time elapse and then outputs a three-phase shorting signal (OV signal). As a result, the three-phase open state is sustained over Δt1 and then the operation shifts into the three-phase shorted state. At this time, it is necessary to ensure that the voltage immediately before shifting into the three-phase shorted state does not exceed the second overvoltage representing the difference obtained by subtracting the switching surge voltage from the IGBT voltage withstand limit.

In the example presented in FIG. 5, the IGBT voltage withstand limit is 600 V and the switching surge voltage is 150 V. Accordingly, the difference between the second overvoltage (450 V and the first overvoltage (400 V±10 V) at its smallest is 40 V. Thus, assuming that the rate of the voltage increase is approximately 1 V/μs, the tolerated length of time for overvoltage protection is approximately 40 μs. This means that, the accuracy for the first overvoltage detection needs to be set by ensuring that the sum of the first overvoltage detection delay time and Δt1 is equal to or less than 40 μs. After shifting into the three-phase shorted state, the voltage at the DC power source line gradually decreases and the three-phase shorting signal dissipates when the voltage becomes lower than the first overvoltage detection range containing hysteresis. Subsequently, the operation returns to the regular operation following a shift from the three-phase shorted state to the three-phase open state.

Figure 6:
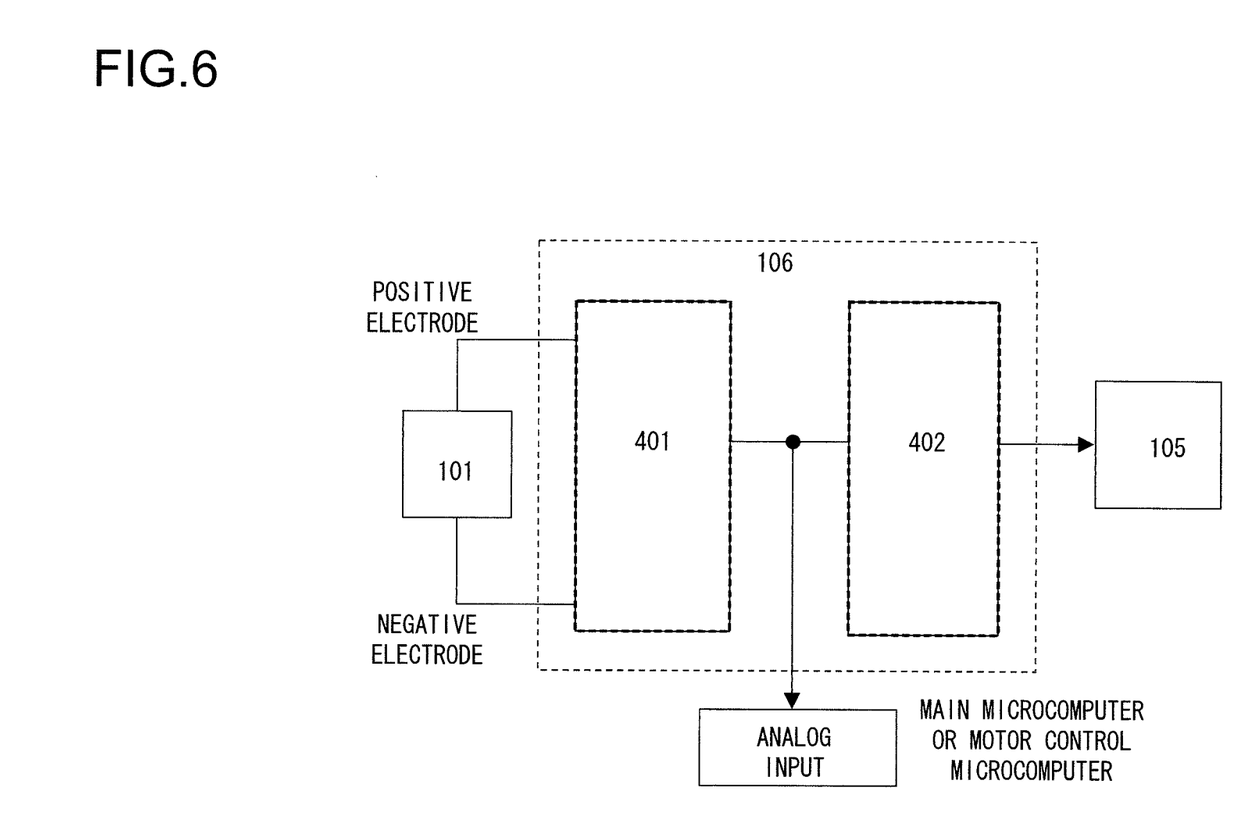
FIG. 6 shows a structure that may be adopted in the overvoltage detection unit in FIG. 1.

FIG. 6 presents a structural example of the overvoltage detection unit 106. The overvoltage detection unit 106 in the example includes two separate units, i.e., a voltage measuring unit 401 and an overvoltage decision-making unit 402. A measured voltage output from the voltage measuring unit 401 is input to the overvoltage decision-making unit 402 and is also input to the main microcomputer or the motor control microcomputer 206.

The operation may shift into the protective phase upon detecting the first overvoltage via the main microcomputer or the motor control microcomputer 206 or based upon a decision made by the overvoltage decision-making unit 402. It is to be noted, however, that if the operation needs to shift into the protective phase within 40 μs including the three-phase open period, as shown in FIG. 5, the protective operation may not start in time due to a longer arithmetic operation cycle of the main microcomputer or the motor control microcomputer 206. In such a case, the overvoltage detection may be executed via the overvoltage decision-making unit 402 constituted with an analog circuit and the protective operation may be executed based upon the detection results so as to ensure that the protective operation against overvoltage can be executed within the length of time over which an overvoltage can be tolerated by reducing the first overvoltage detection delay. It is to be noted that a similar structure may be adopted for the overcurrent detection, so as to enable the protective operation against overcurrent within the length of time over which an overcurrent can be tolerated.

During the three-phase shorted state, the coil currents at the motor 104 may transiently increase until they become equal to or greater than the threshold value set for the overcurrent detection unit 107, resulting in an output of the overcurrent detection signal OC. The motor drive control unit 105 sets priority levels so that a higher priority is given either to the three-phase open state or the three-phase shorted state. Namely, the three-phase shorting signal, triggering the protective operation (cutting off the outputs of the buffers 202a or the buffers 202b) upon detecting an overvoltage, is input to the switching control signal lines at a position further downstream relative to the position at which the three-phase opening signal, triggering the protective operation (cutting off the outputs of the buffers 201) upon detection of an overcurrent, is input. In other words, higher priority is given to the three-phase shorting command over the three-phase opening command and thus, even if the overcurrent detection signal OC is transiently output while the three-phase shorted state is in progress, the three-phase shorted state is continuously executed without disruption and no chattering between the three-phase shorted state and the three-phase open state occurs.

(Explanation of the Inverter Abnormality Detection Unit 108)

Next, the operation executed in response to a gate fault signal output by the inverter abnormality detection unit 108 upon detecting an abnormality at the inverter unit 103 is described. As described earlier, the inverter abnormality detection unit judges that an abnormality has occurred if, for instance, an IGBT shorting current is detected or if the IGBT gate drive source voltage becomes lower than the threshold value.

The gate fault signal input from the inverter abnormality detection circuit 108 to the motor drive control unit 105 is then input to the buffers 203. The buffers 203 are installed on a side further downstream along the switching control signal lines relative to the buffers 202a and 202b engaged in a three-phase shorting operation. In other words, the buffers 203 are given the highest level of priority among the buffers 201, 202a, 202b and 203. As the gate fault signal, which functions as trigger signal, is input to the buffers 203, the outputs of the buffers 203 are cut off. As a result, a gate drive signal, which will turn off all the semiconductor switching elements at the inverter unit 103, is output from the gate drive unit 109. Thus, since the operations of all the semiconductor switching elements stop in response to the gate drive signal, the semiconductor switching elements become electrically discontinuous and enter the three-phase open state.

It is to be noted that a three-phase opening operation is executed as the protective operation in this situation for the following reason. Namely, conceivable causes of an inverter abnormality include a semiconductor switching element breakdown and motor shorting, and it is not considered to be an ideal recourse, particularly from the standpoint of assuring maximum reliability, to execute an operation requiring an electric current to flow between the semiconductor switching elements and the motor, such as the three-phase shorted state, upon detecting an inverter abnormality. In addition, provided that the inverter abnormality detection unit 108 is capable of detecting a shorting current flowing at the semiconductor switching element, protection through three-phase shorting can be sustained without interruption by selecting a setting that allows the gate fault signal to be output in reference to a threshold value higher than the electric current that flows during the three-phase shorted state.

(Main Microcomputer Taking Over Functions of Motor Control Microcomputer)

While the structure achieved in the embodiment includes the main microcomputer and the motor control microcomputer 206, the motor drive control unit 105 is normally controlled by the motor control microcomputer 206. Thus, if any abnormality occurs in the motor control microcomputer 206, the motor 104 may malfunction or a problem may arise in the semiconductor switching elements 3a to 3f.

Accordingly, if the main microcomputer detects an error in the motor control microcomputer 206, e.g., if the main microcomputer detects a power down at the motor control microcomputer 206, the main microcomputer initiates a protective operation by outputting a three-phase opening signal or a three-phase shorting signal in order to assure vehicle safety. Under such circumstances, motor rotating speed information (e.g., a resolver signal) may be input to the main microcomputer so as to allow the main microcomputer to select either the three-phase opening signal or the three-phase shorting signal in correspondence to the motor rotating speed.

It is also conceivable that a three-phase opening signal or a three-phase shorting signal is erroneously output from the main microcomputer due to a main microcomputer malfunction. Accordingly, the motor control microcomputer 206 executes error diagnosis for the main microcomputer and upon judging that an error has occurred at the main microcomputer, the motor control microcomputer outputs an invalidation signal in order to invalidate the control signal generated by the main microcomputer. The motor control microcomputer 206 may execute error diagnosis for the main microcomputer by, for instance, detecting an error if the main microcomputer fails to return a matching response (e.g., the matching response to a "1+1" arithmetic operation command) to an arithmetic operation command issued by the motor control microcomputer 206 through an SPI communication. Furthermore, any erroneous detection in the error diagnosis executed by the main microcomputer and the motor control microcomputer 206 can be prevented by verifying the command/response match via a plurality of microcomputers. In addition, the motor control microcomputer 206 is able to invalidate the control signal (the three-phase opening signal or the three-phase shorting signal) output from the main microcomputer by, for instance, inputting an invalidation signal as a control signal for a three-state buffer and setting the impedance on the output side to a high level.

Through these measures, the three-phase opening signal or the three-phase shorting signal output from the main microcomputer can be disregarded in the event of an abnormality occurring at the main microcomputer and thus, erroneous execution of a protective operation can be prevented.

Figure 7:
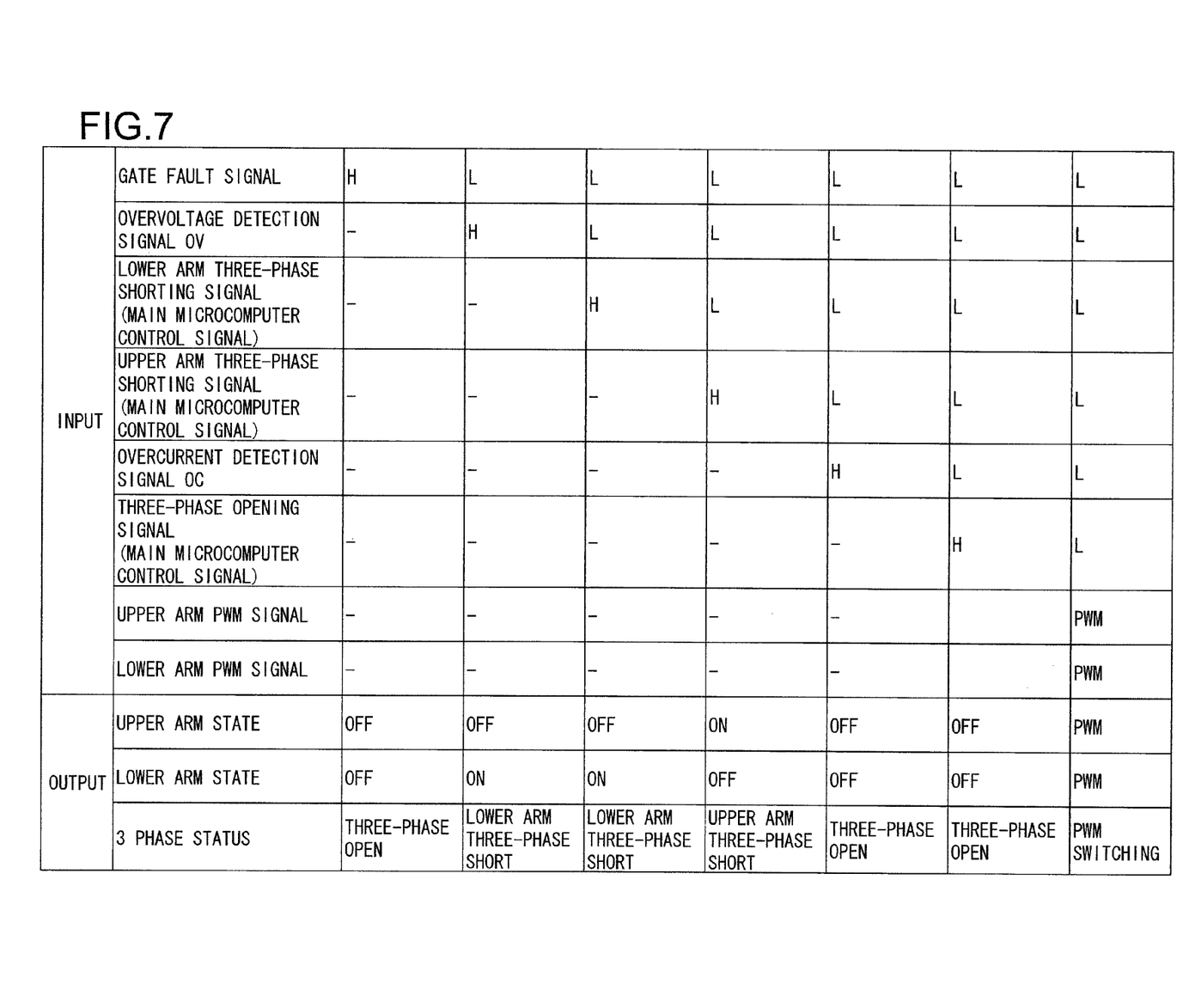
FIG. 7 presents a logical table pertaining to protective operations.

FIG. 7 presents a logical table pertaining to the protective operations executed in the power conversion device in the embodiment as described above. The various signals and the corresponding operations are listed in the order of their priority levels below. It is to be noted that a control signal provided by the main microcomputer is invalidated if the motor control microcomputer 206 judges that an abnormality has occurred in the main microcomputer, as explained earlier. In addition, the three-phase open state is assumed when the motor control microcomputer 206 is reset, since the motor control is disabled.

gate fault signal (three-phase opening)
overvoltage detection signal OV (three-phase shorting)
lower arm three-phase shorting signal (three-phase shorting) provided by the main microcomputer
upper arm three-phase shorting signal (three-phase shorting) provided by the main microcomputer
overcurrent detection signal OC (three-phase opening)
three-phase opening signal (three-phase opening) provided by the main microcomputer
motor control microcomputer being reset (three-phase opening)
regular operation (PWM signal)

As described earlier, the power conversion device achieved in the embodiment comprises the inverter unit 103 that converts a DC current supplied from the DC power source 101 to an AC current by engaging the plurality of semiconductor switching elements 3a to 3c constituting upper arms and the plurality of semiconductor switching elements 3d to 3f constituting lower arms in switching operation, the motor drive control unit 105, equipped with the motor control microcomputer 206, which functions as a signal generation unit that generates a switching signal carrying a switching operation command for each of the plurality of semiconductor switching elements 3a to 3c constituting the upper arms and the plurality of semiconductor switching elements 3d to 3f constituting the lower arms and outputs the switching signal thus generated as a control signal, and the gate drive unit 109 that individually drives the semiconductor switching elements 3a to 3f based upon a plurality of control signals corresponding to the semiconductor switching elements 3a to 3f. The motor drive control unit 105 includes a plurality of protection circuits constituted with buffers that directly output control signals input thereto when the power conversion device is not engaged in a protective operation but output control signals for setting the semiconductor switching elements 3a to 3f either in a cut-OFF state or in an electrically continuous state instead of the control signals input thereto when the power conversion device is engaged in a protective operation, with a buffer 201, a buffer 202a or 202b and a buffer 203 connected in series on each control signal line extending between the motor control microcomputer 206 and the gate drive unit 109.

Since the buffer 201, the buffer 202a or 202b and the buffer 203 are connected in series, higher priority is set for a buffer further on the downstream side, making it possible to execute a plurality of protective operations under integrated control.

For instance, a switching signal (PWM signal) provided by the motor control microcomputer 206 is input to the buffer 201 functioning as a first protection circuit. If a first trigger signal (e.g., a three-phase opening signal or a three-phase shorting signal) is input to the buffer 201 due to an occurrence of an error, the buffer 201 outputs a control signal (high signal) for setting the corresponding semiconductor switching element among the semiconductor switching elements 3a to 3f constituting upper arms and lower arms in a cut-OFF state, in place of the switching signal input thereto. However, it directly outputs the switching signal input thereto as a control signal if no first trigger signal has been input. The control signal pertaining to either an upper arm or a lower arm, among the control signals output from the corresponding buffer 201, is input to the buffer 202a or 202b functioning as a second protection circuit. If a second trigger signal (e.g., a three-phase shorting signal) is input to the buffer 202*a* or 202*b* due to an occurrence of an abnormality, it outputs a control signal for setting the corresponding semiconductor switching element in an electrically continuous state constituting the upper or lower arm to the semiconductor switching element in place of the control signal having been input thereto from the buffer 201. However, if no second trigger signal is input, it directly outputs the control signal input from the buffer 201. The gate drive unit 109 drives the plurality of semiconductor switching elements 3*a* to 3*c* constituting the upper arms and the plurality of semiconductor switching elements 3*d* to 3*f* constituting the lower arms based upon control signals pertaining to either the upper arms or the lower arms output from the buffers 202*a* or 202*b* and the control signals pertaining to the other arms output from the buffers 201.

Since the buffers 202*a* and 202*b* are disposed further on the downstream side relative to the buffers 201 on the control signal lines extending from the motor control microcomputer 206 to the gate drive unit 109, the protective operation (three-phase shorting) via the buffers 202*a* or 202*b* is executed with a higher priority than the protective operation (three-phase opening) via the buffers 201.

In addition, as a first protection signal (three-phase shorting signal) that will set all the semiconductor switching elements corresponding to either the upper arms or the lower arms in an electrically continuous state and set all the semiconductor switching elements corresponding to the other arms in a cut-off state, is generated, the motor drive control unit 105 inputs the three-phase shorting signal to the buffers 201 as the first trigger signal and also inputs the three-phase shorting signal to the buffers 202*a* or the buffers 202*b* as the second trigger signal, so as to create a first period during which all the semiconductor switching elements constituting either the upper arms or the lower arms sustain the electrically continuous state and all the semiconductor switching elements constituting the other arms sustain the cut-off state, with the first period directly preceded by and directly followed by a second period (Δt1, Δt2) during which the semiconductor switching elements 3*a* to 3*f* constituting both the upper arms and the lower arms remain in the cut-off state. Through these measures, shorting between the upper-arm semiconductor switching elements and the lower-arm semiconductor switching elements can be effectively prevented while the three-phase shorting control is executed.

Furthermore, it is desirable that the second period (Δt1, Δt2) be set so as to extend over a length of time equal to or greater than the dead time value (the rated dead time value of the semiconductor switching elements) guaranteed by the inverter unit 103. By setting the length of the second period to such a value, shorting between the upper-arm semiconductor switching elements and the lower-arm semiconductor switching elements can be reliably prevented.

Moreover, the power conversion device may include an overvoltage detection unit 106 that generates an overvoltage detection signal to be used as a first protection signal (three-phase shorting signal) whenever the voltage value indicating the voltage at the DC power source line 101 through which a DC current is supplied exceeds a predetermined overvoltage threshold value, and in such a case, the overvoltage detection signal may be input as trigger signals to the buffers 201 and the buffers 202*a* or 202*b*. Since a three-phase shorted state will be executed upon detecting an overvoltage, any problems that would arise from an overvoltage can be prevented.

An optimal overvoltage threshold value should be selected by ensuring that the voltage at the start of the first period never exceeds the DC voltage obtained by subtracting the switching surge voltage from the semiconductor switching element voltage withstand limit, so as to prevent any adverse effect of an overvoltage on the semiconductor switching elements.

When the second protection signal (three-phase opening signal) for setting all the semiconductor switching elements 3*a* to 3*f* constituting the upper arms and the lower arms in the cut-off state is generated, a three-phase open state is executed in response to the three-phase opening signal input as the second trigger signal to the buffers 202*a* and 202*b*, so as to assure safety of the semiconductor switching elements 3*a* to 3*f*. Any adverse effect of an overcurrent can be prevented by, for instance, sensing via the overcurrent detection unit 107 that the current value on the output side of the inverter unit 103 exceeds an overcurrent threshold value and generating an overcurrent detection signal to be used as the second trigger signal.

In addition, the power conversion device may include an inverter abnormality detection unit 108, which generates a third trigger signal upon detecting an abnormality in the inverter unit 103. The power conversion device may further include buffers 203 to operate in conjunction with the inverter abnormality detection unit 108 disposed on the output side of the 202*a* and 202*b* on the control lines with control signals pertaining to the lower arms output from the buffers 202*b* and control signals pertaining to the upper arms output from the buffers 201 input thereto, the buffers 203 will individually output control signals (high signals), which will set all the switching elements constituting both the upper arms and the lower arms into the cut-off state, to the semiconductor switching elements 3*a* to 3*f* if the third trigger signal is input thereto, but will directly output the control signals having been input from the buffers 201 and the buffers 202*a* and 202*b* if no third trigger signal is input thereto. This structure will allow a three-phase open operation to be executed with the highest priority whenever an abnormality in the inverter unit 103 is detected.

In the embodiment described above, the operations executed with the timing indicated in the timing chart in FIG. 3 is achieved via the buffers 201, 202*a*, 202*b*, and 203, the three-phase shorting drive signal control logic 204 and the timer circuit 205 each constituted with a hardware circuit. However, an operation may be executed with the timing indicated in the timing chart presented in FIG. 3 through a configuration that includes a PLD (programmable logic device) or an FPGA (field programmable gate array), a microcomputer, a software program executed by the microcomputer and the like. However, these components need to operate independently of a component that generates the three-phase opening signal and the three-phase shorting signal.

In addition, during a three-phase shorted state in which an electric current is circulated by turning on the semiconductor switching elements 3*a* to 3*c* constituting the upper arms or the semiconductor switching elements 3*d* to 3*f* constituting the lower arms, the semiconductor switching elements, having been turned on, are bound to become heated. Accordingly, in order to protect the semiconductor switching elements from problems attributable to such heat, the upper arms and the lower arms may be alternately set in the three-phase shorted state through a three-phase shorting switch-over. Such a switch-over may be achieved under control executed by the main microcomputer or the motor control microcomputer 206, or it may be achieved via a hardware circuit.

Furthermore, the power source for the buffers 201, 202*a*, 202*b* and 203 should be a power source that is effective when at least either the motor control microcomputer 206 or the main microcomputer is in operation. For instance, it may be a redundant power source that supplies power to both the motor control microcomputer 206 and the main microcomputer. Such a power source will be required to enable main microcomputer control and motor control microcomputer control under the following circumstances. For instance, the power source for the motor control microcomputer 206 may fail, disabling control of the motor 104 by the motor control microcomputer 206. In this situation, the power conversion device must shift into a protective operation with the outputs from the buffers 201, 202*a*, 202*b* and 203 controlled with signals provided by the main microcomputer. In addition, whenever the power source for the main microcomputer fails, the motor drive will need to be controlled by the motor control microcomputer 206.

The embodiments described above may be adopted singularly or in combination to realize a singular advantage or a combination of advantages. In addition, as long as the features characterizing the present invention are not compromised, the present invention is not limited to any of the specific structural particulars described herein. While the present invention has been described in reference to the embodiments on an example in which it is adopted in a power conversion device engaged in drive of the motor in a hybrid vehicle, the present invention is not limited to this example and may be adopted equally effectively in a device that uses a motor as a drive source with a load that is likely to induce a significant flywheel effect on the motor connected thereto. It may further be adopted in applications, an object of which is to protect semiconductor switching elements in an inverter included in a power generation device such as a wind power generation device.

What is claimed is:

1. A power conversion device, comprising:
   an inverter that converts a DC current supplied from a DC power source to an AC current by engaging first switching elements, which constitute an upper arm, and second switching elements, which constitute a lower arm, in switching operation;
   a control unit that includes a signal generation unit that generates a switching signal carrying a command for execution of the switching operation in correspondence to each of the first switching elements constituting the upper arm and the second switching elements constituting the lower arm, and a plurality of protection circuits that outputs the switching signal having been input thereto as a first control signal when a protective operation is not executed, and outputs a second control signal for setting the first and second switching elements either in a cut-off state or in an electrically continuous state in place of the switching signal having been input thereto when the protective operation is executed; and
   a drive unit that individually drives the first switching elements and the second switching elements according to the first or second control signal, wherein:
   the plurality of protection circuits are disposed in series on a control signal line extending between the signal generation unit and the drive unit.

2. A power conversion device according to claim 1, wherein:
   the plurality of protection circuits includes a first protection circuit and a second protection circuit connected in series;
   the first protection circuit, to which the switching signal provided by the signal generation unit is input, outputs the second control signal for setting the first and second switching elements in the cut-off state to the first and second switching elements constituting the upper arm and the lower arm in place of the switching signal having been input thereto if a first trigger signal is input thereto due to an occurrence of an abnormality but directly outputs the switching signal having been input thereto as the first control signal if the first trigger signal is not input;
   the second protection circuit, to which the first or second control signal pertaining to one of the upper arm and the lower arm and output from the first protection circuit is input, outputs a third control signal for setting the first or second switching elements constituting the one of the upper arm and the lower arm into the electrically continuous state to the first or second switching elements corresponding to the one of the upper arm and the lower arm in place of the first or second control signal having been input thereto from the first protection circuit when a second trigger signal is input thereto due to an occurrence of an abnormality but directly outputs the first or second control signal having been input thereto from the first protection circuit if the second trigger signal is not input; and
   the drive unit individually drives each of the first switching elements constituting the upper arm and the second switching elements constituting the lower arm based upon any of the first, second, and third control signals pertaining to the one of the upper arm and the lower arm output from the second protection circuit and the first or second control signal pertaining to an other arm output from the first protection circuit.

3. A power conversion device according to claim 2, wherein:
   as a first protection signal for setting one of all the first switching elements constituting the upper arm and all the second switching elements constituting the lower arm in the electrically continuous state and setting another of all the first switching elements and all the second switching elements in the cut-off state is generated, the control unit creates a first period during which the one of all the first switching elements and all the second switching elements sustain the electrically continuous state and the other of all the first switching elements and all the second switching elements sustain the cut-off state by inputting the first protection signal to the first protection circuit as the first trigger signal and inputting the first protection signal to the second protection circuit as the second trigger signal, with the first period directly preceded by and directly followed by a second period during which all the first switching elements and all the second switching elements remain in the cut-off state.

4. A power conversion device according to claim 3, wherein:
   the second period is set so as to extend over a length of time equal to or greater than a dead time value guaranteed by the inverter.

5. A power conversion device according to claim 3, wherein:
   the control unit includes;
   a delay circuit that retards timing with which the second trigger signal is input to the second protection circuit by a predetermined length of time corresponding to the second period directly preceding the first period relative to timing with which the first trigger signal is input to the first protection circuit; and
   a timer circuit that causes the first trigger signal to be continuously input to the first protection circuit over a predetermined length of time corresponding to the second period directly following the first period even after generation of the first protection signal stops.

6. A power conversion device according to claim 3, further comprising:

an overvoltage detection unit that generates an overvoltage detection signal to be used as the first protection signal when a voltage value indicating a voltage at a DC power source line through which the DC current is supplied exceeds a predetermined overvoltage threshold value.

7. A power conversion device according to claim 6, wherein:

the overvoltage threshold value is set so that the voltage at a start of the first period never exceeds a DC voltage obtained by subtracting a switching surge voltage from a voltage withstand limit of the switching elements.

8. A power conversion device according to claim 2, wherein:

when a second protection signal for setting all the first switching elements and all the second switching elements in the cut-off state is generated, the control unit inputs the second protection signal to the first protection circuit as the first trigger signal.

9. A power conversion device according to claim 2, further comprising:

an overcurrent detection unit that generates an overcurrent detection signal to be used as the second protection signal when a current value indicating an electric current on an output side of the inverter exceeds an overcurrent threshold value.

10. A power conversion device according to claim 2, further comprising:

an abnormality detection unit that generates a third trigger signal upon detecting an abnormality in the inverter, wherein:

a third protection circuit is disposed on an output side of the second protection circuit on the control line, wherein any of the first, second and third control signals pertaining to the one of the upper arm and the lower arm output from the second protection circuit and the first or second control signal pertaining to the other arm output from the first protection circuit are input to the third protection unit, and the third protection unit outputs to all the first switching elements and all the second switching elements a fourth control signal for setting all the first switching elements and all the second switching elements in the cut-off state if the third trigger signal is input thereto but directly outputs any of the first, second and third control signals having been input thereto from the first protection circuit and the second protection circuit if the third trigger signal is not input thereto.

* * * * *